United States Patent [19]

Gioia

[11] Patent Number: 4,691,881

[45] Date of Patent: Sep. 8, 1987

[54] HIGH PERFORMANCE AMPHIBIOUS AIRPLANE

[76] Inventor: G. Leonard Gioia, 255 Fortenberry Rd., A, Merritt Island, Fla. 32952

[21] Appl. No.: 785,470

[22] Filed: Oct. 8, 1985

[51] Int. Cl.$^4$ .................. B64C 35/00; B64C 35/02
[52] U.S. Cl. .................... 244/106; 244/105; 244/101; 114/272; 114/288
[58] Field of Search .............. 244/106, 105, 101; 114/272, 288, 357

[56] References Cited

U.S. PATENT DOCUMENTS

| | | |
|---|---|---|
| D. 227,604 | 7/1971 | Vrooman . |
| 1,314,227 | 8/1919 | Tolman . |
| 1,683,805 | 9/1927 | Reichelt . |
| 1,748,252 | 2/1930 | Sundstedt . |
| 1,922,769 | 8/1933 | Kleinhenz ............... 244/106 |
| 2,096,535 | 10/1937 | Bellanca ................ 244/101 |
| 2,964,271 | 12/1960 | Strawn ................. 244/105 |
| 3,014,674 | 12/1961 | Strawn ................. 114/272 |
| 3,136,505 | 6/1961 | Fleury . |
| 3,190,582 | 6/1965 | Lippisch ............... 244/105 |
| 3,614,032 | 10/1971 | Purcell, Jr. ............. 244/105 |
| 3,672,608 | 6/1972 | Gioia et al. ........... 244/218 |
| 3,844,508 | 10/1974 | Gioia et al. . |
| 3,854,679 | 12/1974 | Smethers, Jr. ......... 244/106 |
| 4,495,884 | 1/1985 | Stark .................. 114/357 |

OTHER PUBLICATIONS

Dolphinair pamphlet, ca., 1979.
Tuttomoto, #3, Mar. 1982, pp. 66–69.
Gente, Jul. 81, #30, pp. 76–78, 80.
Popular Mechanics, Apr. 1971, pp. 77–80 & 180.

Primary Examiner—Joseph F. Peters, Jr.
Assistant Examiner—Lynn M. Fiorito
Attorney, Agent, or Firm—Browdy and Neimark

[57] ABSTRACT

An amphibious executive or business airplane, also having military application, possesses sponsons integrated with the airplane fuselage. The trailing end of the sponsons end in a sharp edge, thus eliminating the need for a hull or float step or venting. A channel is formed by the sponsons and the underside of the fuselage, which channel has a constant cross-section and produces a surface lift effect facilitating take-off and landing. A pair of keels beginning substantially aft of the center of gravity of the airplane provide directional stability on the water. The aircraft is preferably jet powered with the inlet of the engines disposed above the sponsons to eliminate water intake. Variable geometry wings of telescoping design maximize aerodynamic performance on take-off and landing and during the high altitude, high speed cruise regime of the flight.

14 Claims, 11 Drawing Figures

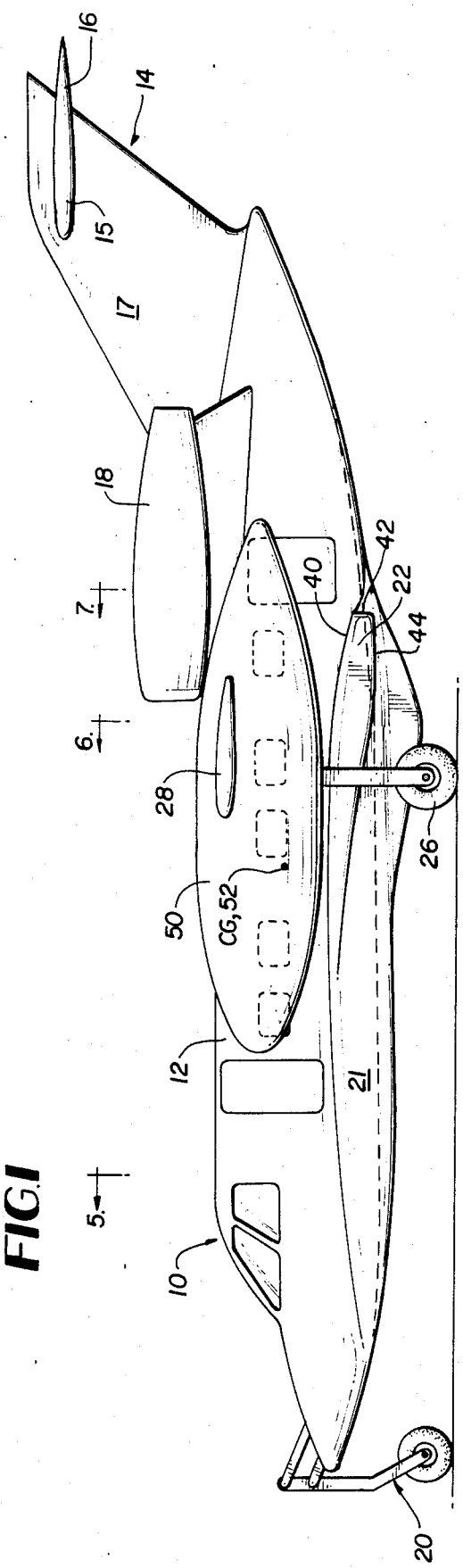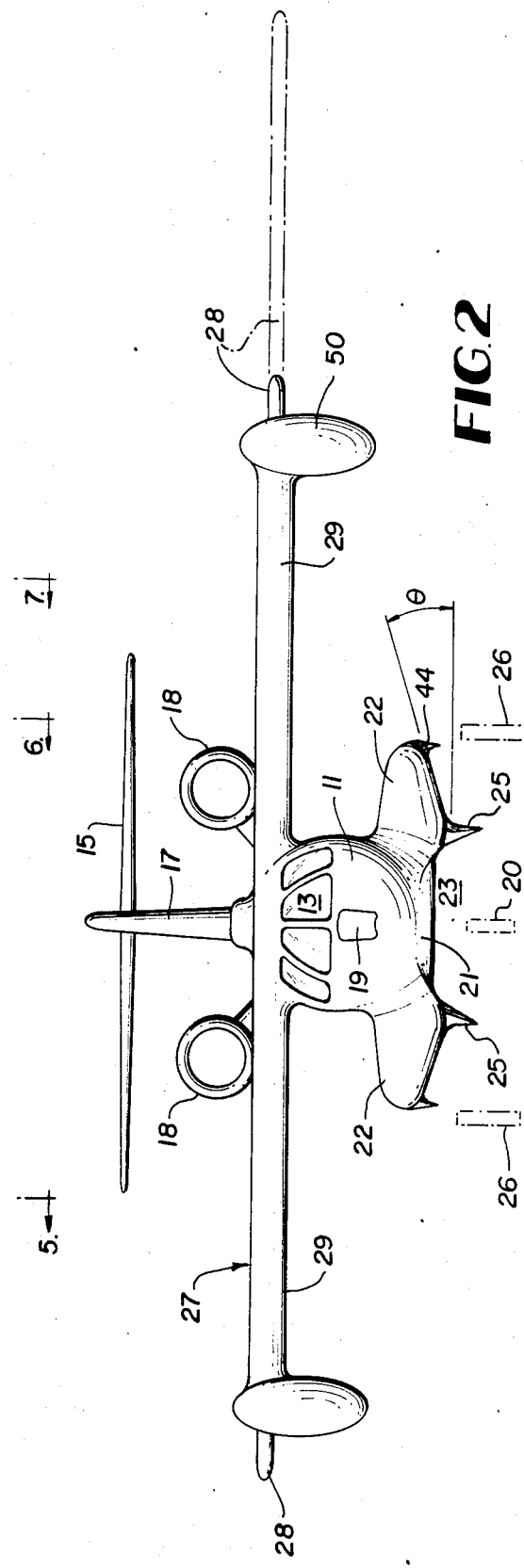

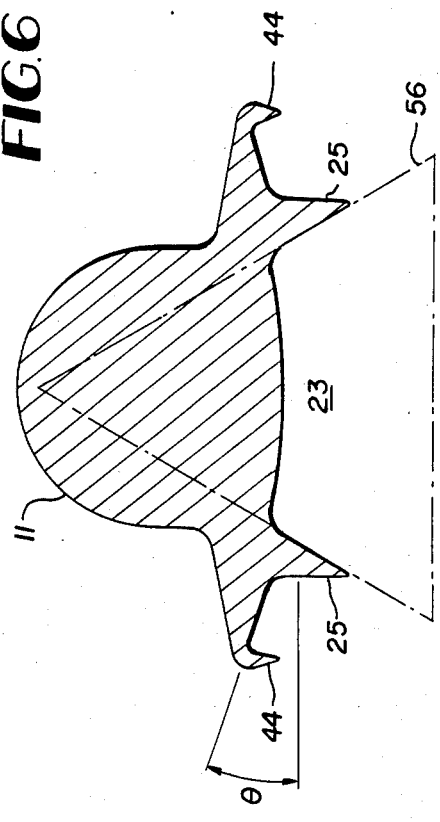
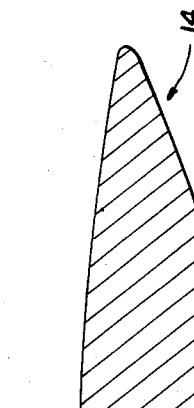
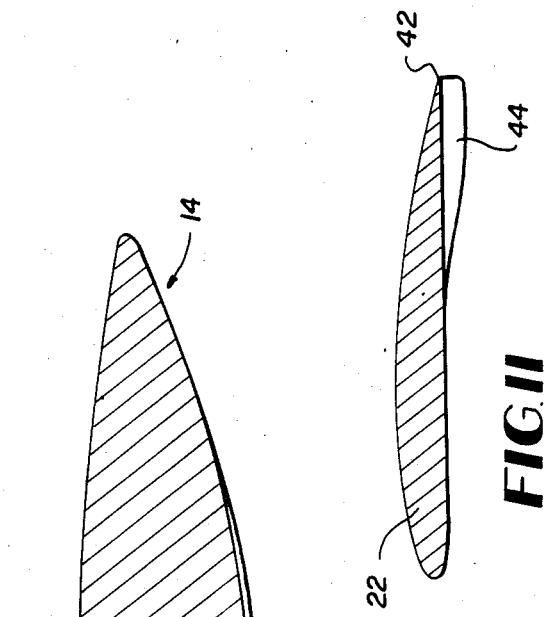
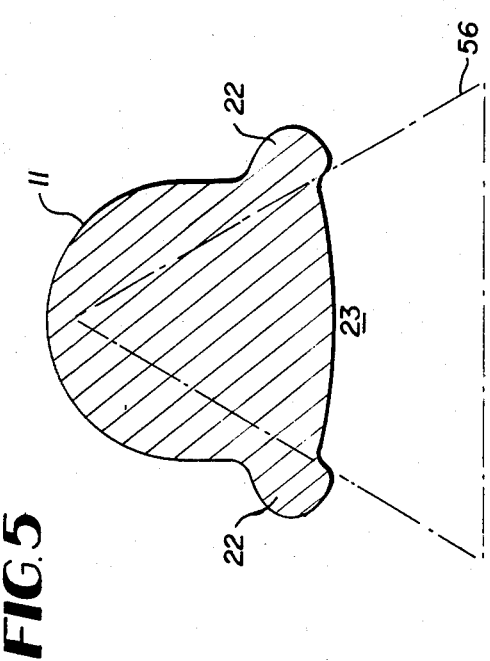

HIGH PERFORMANCE AMPHIBIOUS AIRPLANE

FIELD OF THE INVENTION

The present invention relates generally to the field of aeronautics and more particularly to a high performance, amphibious executive or business airplane, whih may also have military applications, specially designed and suited for short take-off and landing operation from land or water.

BACKGROUND OF THE INVENTION

The amphibious airplane offers unparalleled utility. It also provides for a greater measure of safety than the conventional land airplane. The amphibious airplane is designed to operate from rough airports and available waterways, with or without prepared surface, docking or handling facilities. It is also well suited for operation in remote and undeveloped areas as well as operation in the downtown area of major cities, most of which have sufficient water available for a suitably designed amphibious airplane. After landing on water, the amphibious airplane can taxi onto the adjacent land for boarding and unloading passengers and servicing in the manner of a conventional airplane.

While in transit, every river, pond or lake over a half mile long having reasonably calm water with waves of about two feet or less is an emergency landing field, as are the usual fields and smaller airports. Furthermore, the hull bottom of amphibious airplanes, which are generally stronger than the bottom of the conventional airplane fuselage because of the design requirements of water landing loads, offers more protection in the event of a forced landing.

Despite these enormous advantages, the amphibious airplane does not enjoy any measure of utilization today. Higher initial costs, higher operating costs and generally poorer performance in terms of speed, payload and range have made them unattractive relative to conventional airplanes. This situation exists because of several persistent problems related to the design of amphibious airplanes.

One problem is greater weight because of increased hull structural strength required to absorb the high loads of water landings, which increase substantially with the higher landing speeds generally associated with high performance airplanes. The wings of high performance airplanes are usually designed for the high speed, high altitude flight regime requirements rather than the low speed take-off landing requirements and therefore the high performance airplanes have high stalling speeds and thus high landing speeds. This increased structural weight requires greater engine power, which, in turn, increases the weight still further with the result of both larger initial costs and operating expense. Furthermore, increases in weight and aerodynamic drag result from the traditional V-shape hulls required to absorb the high landing loads, the transverse step required for water take-off, the wing tip floats usually required for transverse stability in the water or the poorly designed hull tunnel of those airplanes using sponsons for transverse stability instead of floats, and the landing gear either hanging in the airstream or stowed in an unsatisfactory manner.

The result of these unsatisfactory designs is substantial degradation of air speed, range and payload and high fuel consumption.

Another problem plaguing the amphibious airplane has been higher maintenance costs associated with water spray, especially the ingestion of water by engines. Added maintenance also results from the water penetrating the air frame through the lower portions of the fuselage and hull due to breach of integrity of these surfaces which traditionally housed retractable landing gear. This problem increases in severity with the increasing landing speeds of high performance aircraft. In the past, engineering design changes have not solved or even substantially alleviated these problems.

The successful amphibious executive airplane must be able to take-off from and land on short airfields or inland water with waves of approximately two feet or less, at low speeds (about 70 to 80 knots). It also must accelerate smoothly to high altitudes (about 35,000 to 40,000 feet) and cruise efficiently at high speeds (Mach number about 0.8) or better for significant distances (about 1,500 to 2,000 miles) carrying at least 6 to 8 passengers and crew. This requires high lift on take-off and landing and thus high aspect ratio wings with large area and the exact opposite during cruise, that is, lower aspect ratio wings with decreased surface area. Further requirements for such a low drag, aerodynamically efficient airplane dictate that the landing gear must retract and be stowed within the airplane. There can be no wing floats or hull steps, and fuselage mounted sponsons for landing and take-off and lateral transverse stability in the water, as well as the hull itself, must be aerodynamically and hydrodynamically clean and efficient. Water spray and especially ingestion by the engines must be eliminated or kept to an absolute minimum. In addition, the requirement for integrity of the hydrodynamic planing surfaces would preclude the use of hydrofoils or hydroskis, which are otherwise not desirable because of their added weight and operational complexity.

SUMMARY OF THE INVENTION

In the light of the foregoing, it is a principal object of the present invention to provide an amphibious executive or business airplane, also having military application, of the type described immediately above which possesses sponsons integrated with the airplane fuselage. The sponsons provide inherent static and dynamic transverse stability in the water, eliminating the need for wing mounted floats, and house the landing gear and fuel tanks. An inverted channel of constant shape is formed by the sponsons and the bottom of the hull. The outermost surface of the sponsons is parallel to the fuselage center line and the hull channel formed by the sponsons is of constant cross-section, both resulting in minimum aerodynamic and hydrodynamic drag. The channel design also produces a surface lift effect facilitating take-off and landing. The aft end of the sponsons terminate in a sharp trailing edge, which design eliminates the need for a hull or float step or venting. The trailing edges of the sponsons are so arranged with respect to the channel that, upon take-off, the trailing edge of the sponsons is the last part of the aircraft in contact with the water, a tunnel of air being provided between the sponsons. The sponson design also results in a gradual increase in water displacement on touchdown, absorbing the landing loads. Directional stability on water is provided by twin keels located aft of the center of gravity and extending from the inner surface of the sponsons. The sponsons are located outboard of the engines and are designed to protect the engines from water ingestion.

Another object of the present invention is to provide an amphibious airplane of the type described having both the nose landing gear and the main landing gear retractable into the upper surfaces of the airplane fuselage and sponsons in a manner such that the integrity of the hydrodynamic surfaces remains unbreached. All landing gear is preferably stowed above the water line for minimum corrosion problems and diminished maintenance necessity.

A further object of the present invention is to provide an amphibious airplane of the type described which has variable geometry wings to maximize the aerodynamic performance on take-off and landing and during the high altitude, high speed cruise regime of the flight. The wing is of a telescoping design having a large area and aspect ratio when the moveable wing is in the extended position for take-off and landing, providing the high lift and low stalling speed required during this regime of the flight, and provides the lower drag and bending moments necessary for efficient high speed, high altitude cruise with the moveable wing in the retracted configuration.

Still another object of the present invention is to provide an amphibious airplane of the type described which will have the main components of the airplane surfaces constructed of composite materials by the process of molding which will substantially facilitate the manufacturing process, reducing the initial cost of the airplane and the maintenance expense since this type of construction is far less susceptible to water impact and corrosion damage.

BRIEF DESCRIPTION OF THE DRAWINGS

The foregoing, together with other and further objects and advantages fo the present invention, which will become more readily apparent, consists in the construction, combination, and arrangement of parts, all as hereinafter more fully described, claimed and illustrated in the accompanying drawings, wherein:

FIG. 1 is a side elevation view of a high performance, eight place executive type jet amphibious airplane, designed and contructed in accordance with the teachings of the present invention, showing primarily the fuselage and sponson configuration, location of engines relative to the sponsons, trailing edge design of the sponson eliminating a transverse step and the nose landing gear attachment and retraction into the upper surface of the nose;

FIG. 2 is a front elevation view of the same airplane showing primarily the hull channel cross-section, the sponson cross-section, the engine locations and the variable-geometry wing in its telescoped and retracted configuration;

FIG. 5 is a cross-sectional view of the outline of the hull of an airplane in accordance with the present invention when viewed along lines 5—5 of FIG. 1;

FIG. 6 is a cross-sectional view of the outline of the hull of an airplane in accordance with the present invention when viewed along lines 6—6 of FIG. 1;

FIG. 10 is a cross-sectional view of the outline of the hull of an airplane in accordance with the present invention when viewed along lines 10—10 of FIG. 4; and FIG. 11 is a cross-sectional view of the outline of a sponson on an airplane in accordance with the present invention when viewed along lines 11—11 of FIG. 4.

DETAILED DESCRIPTION OF PREFERRED EMBODIMENTS

Figure 3:
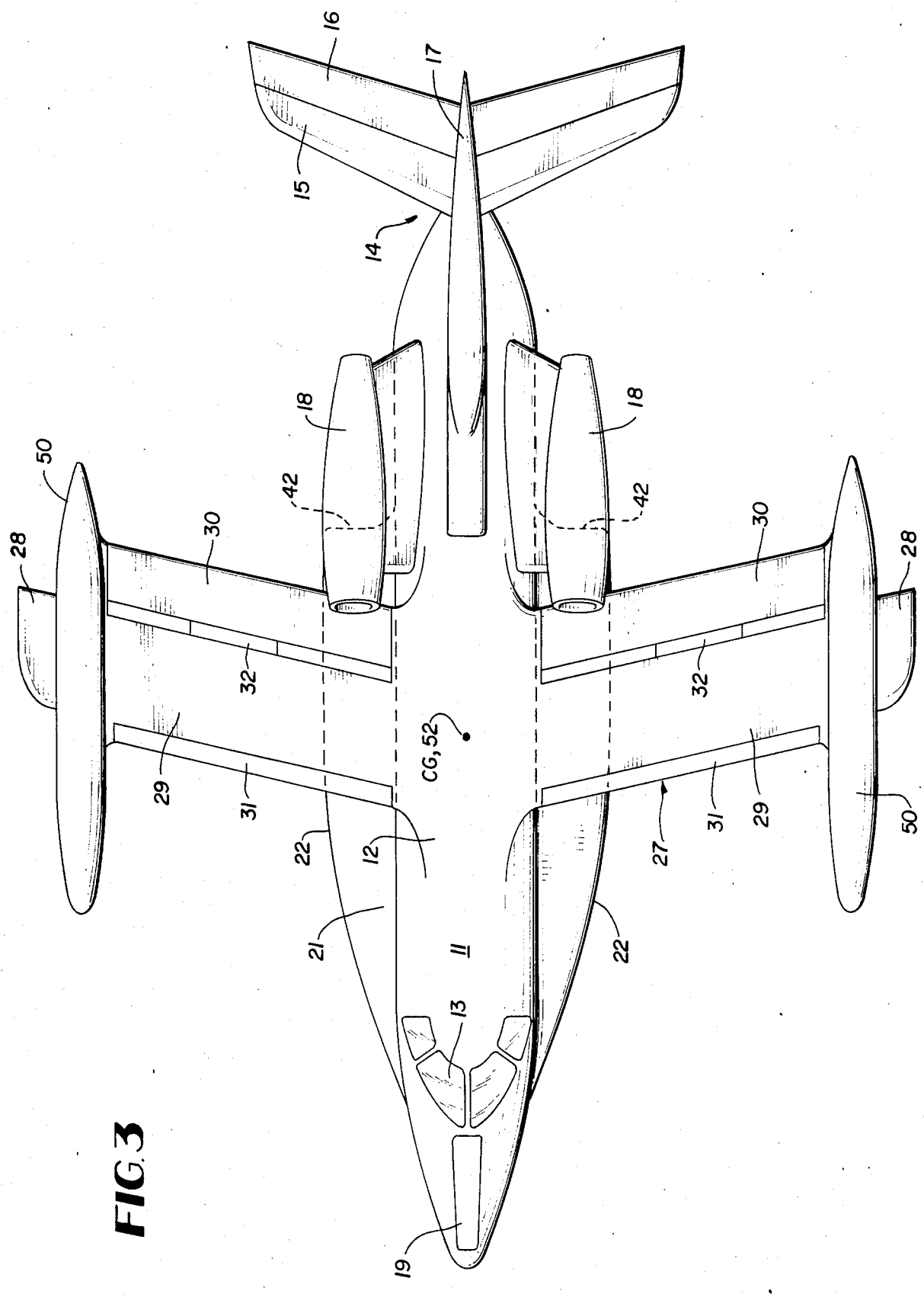
FIG. 3 is a top plan view of the same airplane to show primarily the sponsons relative to the hull and their clean aerodynamic fairing, the engine locations, the nose landing gear door in the upper surface of the nose and the moveable wings in the retracted position.

Referring now more particularly to the drawings, throughout which like reference numbers indicate like parts, 10 designates the preferred embodiment of the amphibious airplane in accordance with the present invention. Fuselage 11 is shown in FIG. 1 to be generally streamlined and shaped in side profile like an airfoil to provide for fuselage lifting effect. Fuselage 11, which contains a conventional passenger cabin 12 and cockpit 13 for the crew, is further shown to be generally circular in cross-section.

Fuselage 11 terminates at the aft end in a T-tail 14 with the horizontal stabilizer 15 and control surfaces or elevators 16 (see also FIG. 3 and 4) located near the top of the vertical stabilizer 17. This T-tail configuration provides the major advatage in operation on water of removing the control surfaces from the effects of water spray.

At its forward end, the fuselage 11 contains on the top of its nose, a door 19 covering a compartment in which the nose landing gear 20 is stowed during flight. The gear retracts forward and over the nose of the fuselage 11 and then down into the compartment, with the nose gear doors 19 covering the compartment during flight. This design preserves the integrity of the bottom of the fuselage, eliminating one of the major sources of water damage and thus reducing maintenance expense. The construction of the fuselage of the airplane out of composite materials will fruther reduce maintenance through resistance to water damage. This design also reduces the hydrodynamic and aerodynamic drag.

The composite material of which the fuselage is molded, is preferably a fiber reinforced polyester resin. However, the fiber reinforcement must be selected to give sufficient strenghth required for this purpose. Fiberglass reinforced resin, for example, will not have sufficient strength. An excellent composite material from the standpoint of superior strength, low weight and total lack of corrosion problems uses Kevlar 49 (a product of E. I. Dupont) as the fiber reinforcement. Kevlar 49 is an aramid fiber composed of poly (1,4-phenylenterephthalamide). Other aramid fibers may also be used. In addition to Kevlar 49, at points in the fuselage where it is important that the fibers be strong, not only in tensile stress but also in shear stress, carbon and boron fibers may also be added.

During take-off and landing, the nose landing gear doors are in a nearly closed positon with the gear extended as not to obstruct the view of the pilot allowing him to taxi the airplane safely.

Running along the underside and integral with the fuselage 11 is the fuselage hull 21, which provides the airplane with a substantially smooth bottom design. The two sides of the fuselage hull 21 comprise sponsons 22. Between the extremities of the sponsons 22, two twin keels 25 extend downwardly from the underside of the hull 21, the substantial part of which are disposed aft of the center of gravity 52 of the airplane 10. Location of the twin keels 25 aft of the center of gravity 52 causes an inherent directional stability in water operation.

The hull 21 and sponsons 22, including keels 25, form an inverted channel 23, which can particularly be seen in FIGS. 4, 5, 6 and 10. The lower inner walls of sponsons 22 form the walls of the channel 23 and the bottom center of hull 21 forms the roof thereof. The inside surface of the twin keels 25 are extensions of the channel walls and thus effectively increase the depth of the tunnel 23 thereat. The design of the channel 23 is such that although the dimensions of the channel cross-section will change in size, the channel cross-section remains constant in shape with each channel cross-section being proportional in the various dimensions to any other cross-section of the channel. Another way to describe the channel design is to imagine a vertical triangle 56 (see FIGS. 5 and 6) whose base is on a horizontal plane and whose sides coincide with the side walls of channel 23. The channel is designed such that, when the center line of the aircraft is horizontal, the imaginary triangle 56 can be moved fore and aft along the horizontal plane of its base and its sides will always coincide with the walls of the channel. The importance of this design is that aerodynamic and hydrodynamic drag of the airplane is minimized. Since the channel cross-section is of constant shape, there is a minimum movement of air molecules either vertically, horizontally or diagonally with their passage through the channel. During take-off and landing, air is trapped within the channel 23 which air bubble helps break the surface tension and provides support for the airplane through a surface effect lift. The hydrodynamic drag is lower because of less surface contact with the water. The aerodynamic drag is lower because the thin trailing edge, serving prior art the function of the hydrodynamic "step", causes less trubulence and drag, as will be discussed below.

The precise point where the channel 23 blends in with the hull 21 in the forward half of the aircraft is not critical as the portion of the channel 23 aft of the center of gravity 52 is the most important. Similarly, the specific shape of the hull 21 between the sponsons 22 and even further aft is not criticial, as long as it is smooth. It may be substantially flat or slightly curved, as the hull of a conventional boat.

The sponsons 22 have a specific shape in order to serve a variety of useful functions in accomplishing the objects of the present invention. The aircraft has no chine line as the "chine" is defined as "an angular intersection of the sides and bottom of a vessel." The outer sides of sponsons 22 are in the shape of a thick curve with an angular intersections. For the purpose of the present specification and claims the "outermost surface" of the sponsons will be defined as the line formed by the points at which lines tangent to the sponsons are in a vertical plane.

The top to bottom thickness of the aft portion of each sponson 22 diminishes steadily to terminate in a sharp trailing edge 42, as can particularly be seen in FIG. 11. The outermost surface of sponsons 22 is parallel to the fuselage center line and the trailing edge 42 is substantially on the line of the outermost surface of the sponsons 22. the bottom of the hull 21 between the sponsons in the area of the sharp trailing edge 42 has no sharp edges and blends smoothly with the tail assembly 14, as can be seen in FIG. 10. Furthermore, the level of the bottom of the hull 21 (the top of the channel 23) between the sponsons in the area of the sharp trailing edges 42 is above the level of the trailing edges 42. Thus, upon take-off, the sharp trailing edges 42 of the sponsons 22 are the last part of the aircraft in contact with the water, while a cushion of air is passing through the channel 23.

The sharp trailing edge 42 of each sponson is a significant design advantage over the prior art as it eliminates the stepped hull of prior amphibious hull and float designs. It also eliminates the need for venting steps. The purpose of a hydrodynamic "step", which includes a substantially vertical portion at the end of the substantially horizontal portion of the hull in order to form the step, is to give a clean break with the water bearing the weight of the plane without turbulence, particularly during taxing and take-off. The sharp trailing edge 42 of the sponsons accomplishes this function without vertical portion of the step which causes aerodynamic burbles and turbulence, and therefore drag, when in flight. It is thus an important feature of the present invention that the design includes no hydrodynamic "step", as this term is used in the prior art, which includes a substantially vertical segment at the break in the substantially horizontal portion of the hull.

The aft-most portion of each sponson 22 may include a downwardly turned droop tip 44 at the outer portion thereof. The combination of the relatively thich curve of the sponsons 22 and the froop tip 44 significantly improves areodynamic stability as has been established in wind tunnel tests. It should be understood, however, that this is merely a preferred embodiment of the present invention and the airplane will fly even with a straight edge at the outermost surface of the sponsons 22.

As can be seen particularly in FIG. 2, the underside of the sponsons 22 from their inner wall to their outside tip, slope upwardly somewhat to form a positive dihedral angle, shown as angle $\theta$ in FIG. 2. This positive dihedral angle of the outer portion of the sponsons 22, and particularly in the aft segment between the keels 25 and the droop tips 44, allows for a gradual increase in displacement when landing on water, and thus a gradual increase in energy absorption as the airplane sinks deeper into the water on landing. Furthermore, the design of the sponsons 22, which begin near the nose of the plane and end near the tail, provides an excellent length:width ratio for the hull which causes excellent displacement for a relatively small draft in a static state on water.

The outermost surface of the sponsons 22 is parallel to the central line of the fuselage, i.e., the line of flight, for minimum aerodynamic drag. The thickness of the curve at the outside of the sponsons allows the air to flow around it with a total absence of turbulence, even at angles of attack of greater than 12°. The lack of turbulence, minimizes aerodynamic drag.

The sponsons 22 may also be used to contain fuel tanks.

Figure 9:
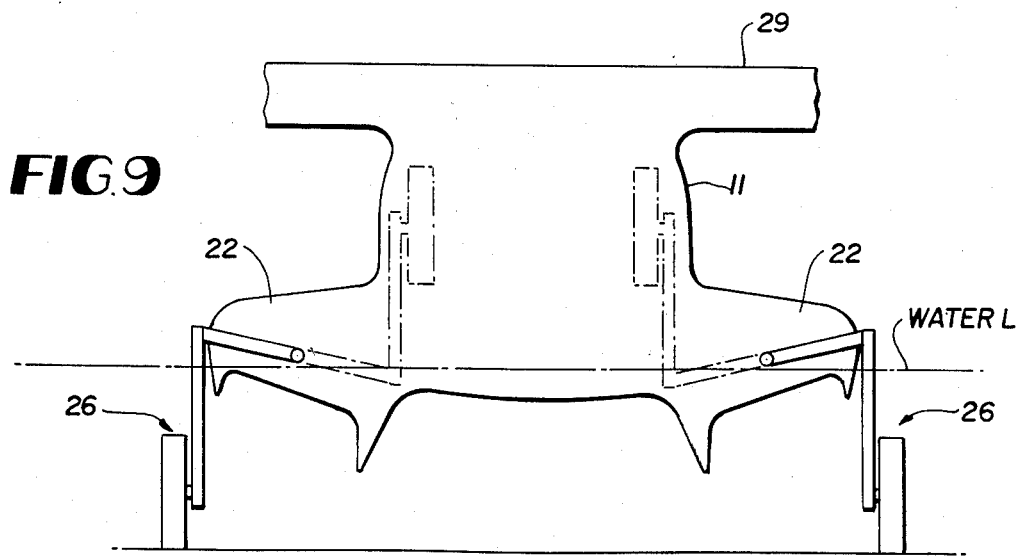
FIG. 9 is a cross-sectional view showing a detail of the rear landing gear attachment.

The main landing gear 26, as shown in FIGS. 1 and 9, retracts into the upper surface of the sponsons 22 and the side of the fuselage 9 in such a manner as not to interrupt the itegrity of the hydrodynamic surfaces of the sponsons 22 or channel 23. As shown in FIG. 9, the landing gear 26 is stored above the water line for minimum corrosion and maintenance.

Figure 4:
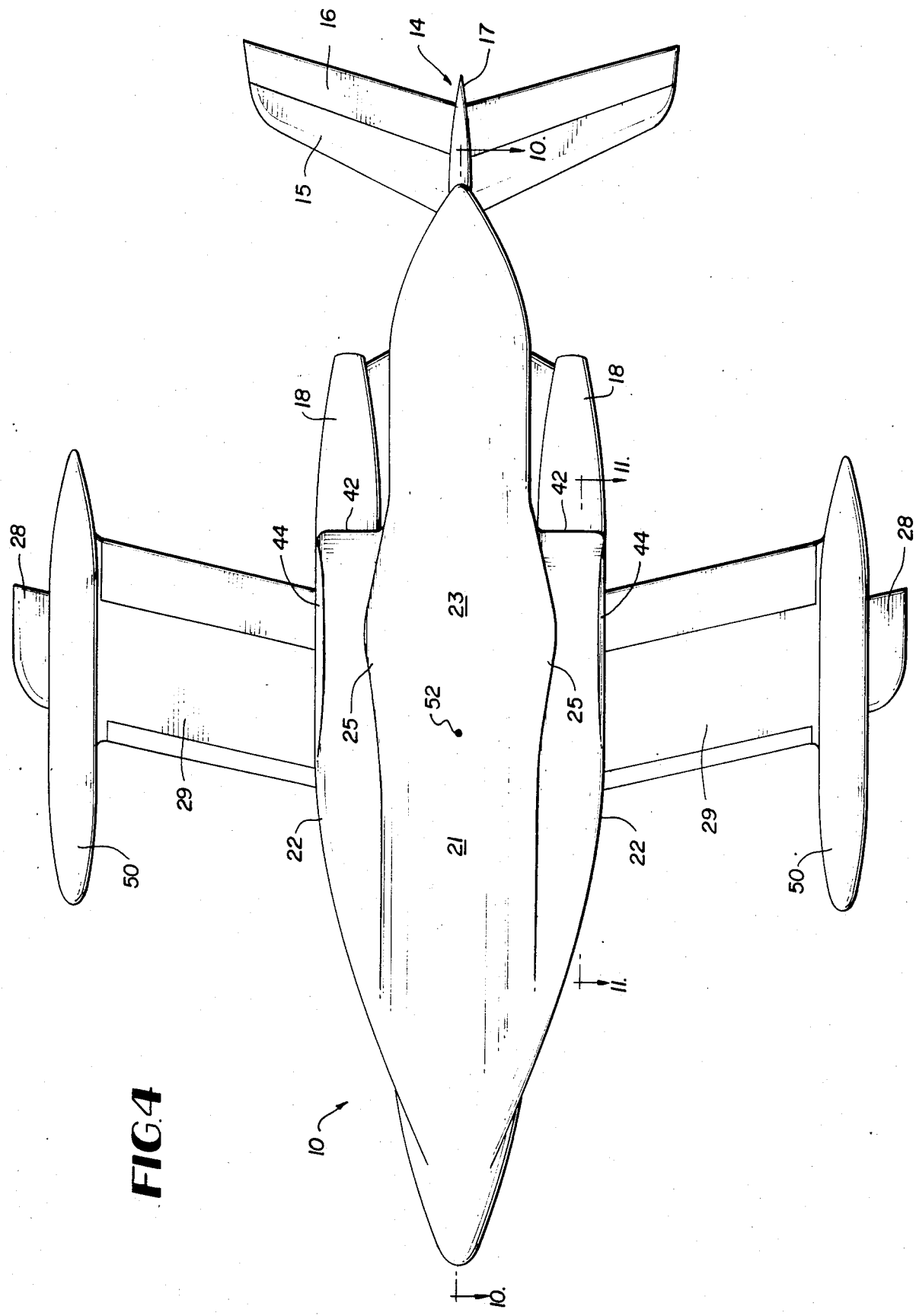
FIG. 4 is a bottom plan view of the same aorplane to show primarily the sponsons and keels.
Figure 7:
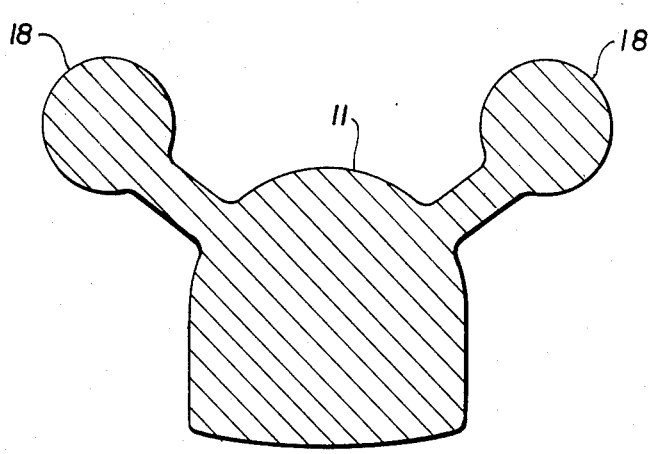
FIG. 7 is a cross-sectional view of the outline of the hull of an airplane in accordance with the present invention when viewed along lines 7—7 of FIG. 1.
Figure 8:
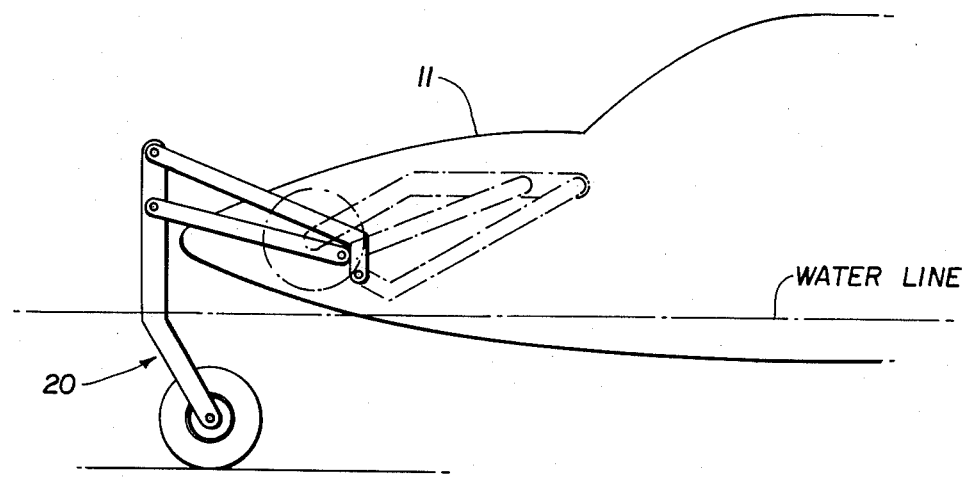
FIG. 8 is a detailed view of the nose landing gear attachments installed in an airplane in accordance with the present invention.

Just forward to the T-tail 14 are two turbojet or turboprop engines 18, one mounted on the top right and one on the top left sides of the fuselage 11 as shown in FIGS. 1, 2 and 3. While jet engines are preferred, propeller engines may also be used if desired, particularly directed fan props. The engines 18 are so located that the inlet end is substantially forward of the trailing edge 42 of the sponsons 22 and inward of the outer edges 44 of sponson 22. Accordingly, the usual problem of water ingestion caused by water spray generated during the take-off and landing operations will not exist with this present invention. The jet exhaust from each of the engines 18 is made to pass below the horizontal stabilizer 15 and the control surfaces 16 of the T-tail 14.

Mounted at the top and cneter of fuselage 11 is a variable-geometry swept wing 27 with a moveable or telescoping wing 28 which retracts into and extends out of the fixed wing 29. Wing tip tanks 50 are fixed to the fixed wing 29 and serve to add structural strength to the fixed wing and also to act as a flow divider in order to smooth out air flow in transition from the inboard wing 29 to the outboard wing 28. It may also serve as a housing for non-weight bearing guide rollers.

The advantage of the telescoping wing is the increased aspect ratio and the increased wing area with the moveable wing 28 in the extended position. This provides this airplane with the capability of short field take-off and landings, increased payloads and take-off and landings on water at lower speeds. This same airplane is capable of high speed, short range flights, lower speed flights at higher altitudes with larger range or any combination of the two, with the moveable wing 28 in the retracted position. In addition, the high aerodynamic wing loading with the moveable wing 28 retracted would provide a smoother ride for the passengers with less sensitivity to air turbulence.

The specific structure of the extendeable wing operation is not part of the present invention, per se, and is known to those skilled in the art, as for example, form the U.S. Pat. Nos. 3,672,608 and 3,884,508 of the present inventor and others.

The high wing configuration of wing 27 in FIGS. 1 and 2 has the important advantage of locating the flaps 30 and leading edge slats 31 as high as possible above the water to minimize the problems of water spray during operation from water.

The perferred design of the wing 27 has the area of the fixed wing 29 about 50–80%, preferably about 65%, of the total wing area with the moveable wing 28 in the extended position, with the area of the moveable wing accounting for about 20–50%, preferably 35%, of the total wing area. Further, the preferable wing configuration includes double-slotted Fowler flaps 30, leading edge-slats 31 and upper wing surface spoilers 32, all depicted in FIG. 3. The high lift devices further aid the short field take-off and landing capacities of this amphibious airplane.

While the present invention has been defined with respect to the particular example of an eight-passenger amphibian jet, the design considerations discussed above, and defined in the attached claims are equally applicable to an airplane which is scaled up or down to hold any number of passengers and crew. Thus, the present invention is not limited to the eight-passenger embodiment.

Pursuant to the requirements of the patent statutes, the present invention has been shown and described in what is believed to be the most practical and preferred embodiment whereby it can be readily practiced by those skilled in the art to which it pertains. It is apparent that numerous variations, modifications, and alterations of the specific structures or forms disclosed and shown will occur or suggest themselves to those skilled in the art and may be made without departing from the spirit and scope of the invention as fairly defined in the appended claims.

What is claimed is:

1. In an amphibious aircraft, having a fuselage with a water-contacting hull, wings, tail assembly, and at least one engine, the improvement wherein said fuselage hull includes sponsons integral therewith extending outwardly on either side of the fuselage, wherein the underside of the combination fuselage and sponsons includes a substantially constant cross section inverted channel, the fuselage further including twin keels extending fore to aft on the underside of said hull, the inner surfaces of said twin keels being substantially extensions of the walls of said channel, and further wherein the top to bottom thickness of the aft portion of said sponsons diminishes continuously without any hydrodynamic step toward the aft end thereof so as to terminate in a sharp trailing edge and the hull portion between said sponsons blends smoothly with said tail assembly of the aft end, without a hydrodynamic step.

2. An amphibious aircraft in accordance with claim 1, wherein a substantial part of said twin keels are disposed aft of the center of gravity of the aircraft.

3. An amphibious aircraft in accordance with claim 1, wherein the underside of said sponsons extend from said channel to their outermost tip at a position dihedral angle.

4. An amphibious aircraft in accordance with claim 3, wherein said dihedral angle is 5 to 45°.

5. An amphibious aircraft in accordance with claim 1, wherein the aft-most portion of the outer edges of said sponsons terminate in droop tips.

6. An amphibious aircraft in accordance with claim 1, wherein said at least one engine comprises at least two jet engines.

7. An amphibious aircraft in accordance with claim 6, wherein the inlet end of each said jet engine is disposed forward of the trailing edge of said sponsons and inward of the outer edge of said sponsons.

8. An amphibious aircraft in accordance with claim 1, wherein the outermost surface of said sponsons is substantially parallel to the center line of said fuselage.

9. An amphibious aircraft in accordance with claim 1, wherein said fuselage hull and sponsons are integral and composed of molded composite fiber reinforced plastic.

10. An amphibious aircraft in accordance with claim 9, wherein the fiber of said fiber reinforced plastic is aramid, carbon, boron or a mixture thereof.

11. an amphibious aircraft in accordance with claim 1, further including nose landing gear means to retract said nose landing gear into the upper surface of the airplane fuselage and main landing gear means to retract said main landing gear into the upper surfaces of said sponsons, whereby the integrity of the hydrodynamic surfaces on the bottom of the hull remains unbreached.

12. An amphibious aircraft in accordance with claim 1, wherein said wings are variable-geometry wings of telescoping design.

13. An amphibious aircraft in accordance with claim 6, wherein said wings are variable-geometry wings of telescoping design.

14. An amphibious aircraft in accordance with claim 1, wherein the outer sides of said sponsons comprise a thick curve, thereby allowing air to flow therearound with minimal turbulence at varying angles of attack.

* * * * *